H. S. COX.
AUTOMOBILE WHEEL.
APPLICATION FILED JUNE 17, 1919.
1,339,168.
Patented May 4, 1920.
2 SHEETS—SHEET 1.
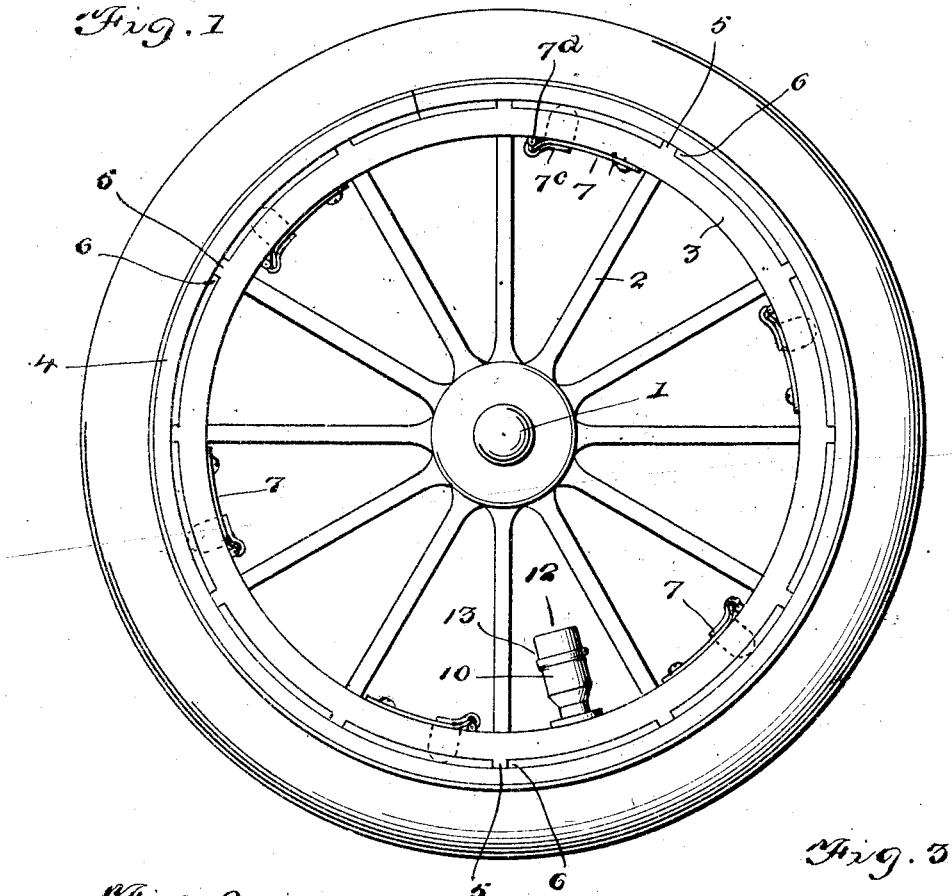
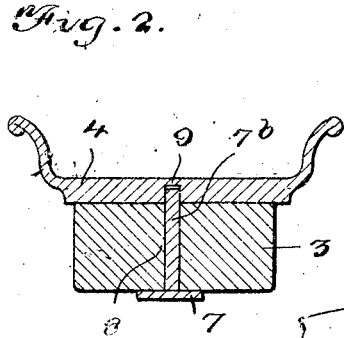
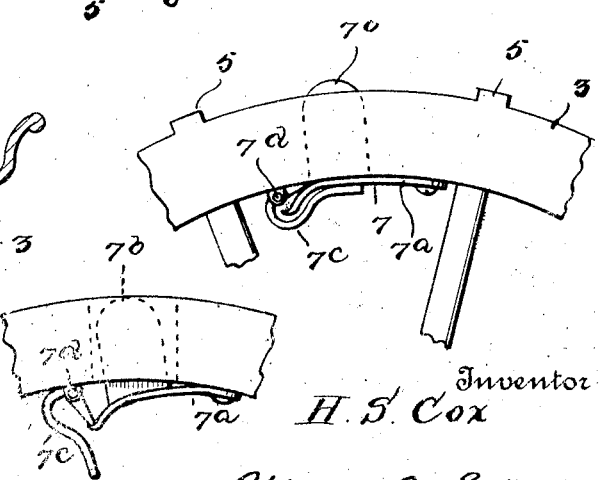
Inventor
H. S. Cox
By Victor J. Evans
Attorney H. S. COX.
AUTOMOBILE WHEEL.
APPLICATION FILED JUNE 17, 1919.
1,339,168.
Patented May 4, 1920.
2 SHEETS—SHEET 2.
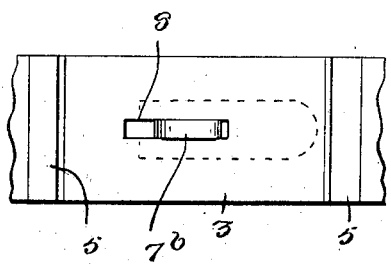
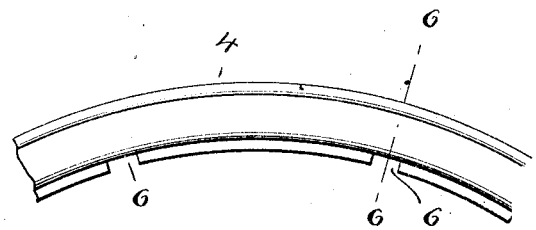
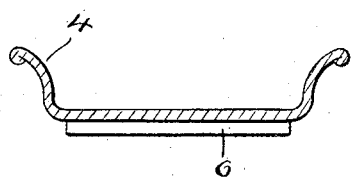
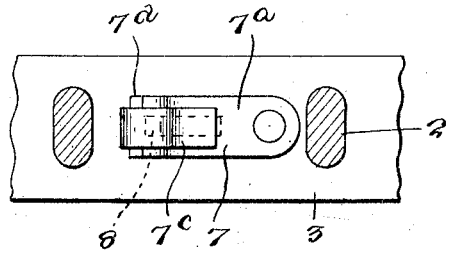
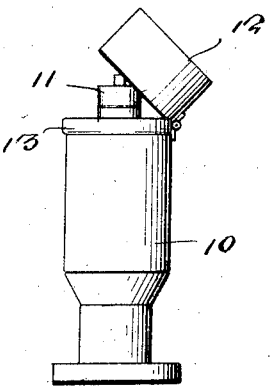
Witnesses
E. R. Ruppert
Inventor
H. S. Cox.
By Victor J. Evans
Attorney

UNITED STATES PATENT OFFICE.

HARRY S. COX, OF CLAYTON, NEW MEXICO.

AUTOMOBILE-WHEEL.

1,339,168.  Specification of Letters Patent.  Patented May 4, 1920.

Application filed June 17, 1919. Serial No. 304,741.

*To all whom it may concern:*

Be it known that I, HARRY S. COX, a citizen of the United States, residing at Clayton, in the county of Union and State of New Mexico, have invented new and useful Improvements in Automobile-Wheels, of which the following is a specification.

My present invention pertains to vehicle wheels, more especially wheels for use on automobiles; and it has for one of its objects the provision in an automobile or other vehicle wheel of an improved rim construction, which is materially advantageous in that it does not embody bolts or other extraneous elements.

Another object of the invention is the provision of a boltless rim member that is susceptible of being readily slipped into place, and which when properly positioned is not liable to creep forwardly or backwardly on the wheel and is not likely to casually slip in a lateral direction, and this without interfering with the ready removal of said rim member when it is desired for any reason to remove the same from the complementary felly.

Another object of the invention is the provision on a felly of a valve stem cover, which is adapted to inclose and exclude dust from the inflation tube of a tire and yet may be readily opened to facilitate the connection of a pump to the tube and may be readily closed subsequently to the inflation of the tire.

Other objects and practical advantages of the invention will be fully understood from the following description and claims when the same are read in connection with the drawings, accompanying and forming part of this specification, in which:—

Figure 1 is a side elevation of a wheel embodying the best practical reduction of my invention that I have as yet devised.

Fig. 2 is an enlarged transverse section taken in the plane indicated by the line 2—2 of Fig. 1 and illustrating the manner in which the removable member of the rim is connected with the felly.

Fig. 3 is a side elevation, on an enlarged scale, showing a portion of the felly of the rim.

Fig. 3ª is a similar view with parts in different positions.

Fig. 4 is an enlarged view showing the periphery of the said body member.

Fig. 5 is a side elevation of the removable rim member *per se*.

Fig. 6 is a transverse section of the same, on an enlarged scale, taken in the plane indicated by the line 6—6 of Fig. 5.

Fig. 7 is an enlarged detailed view of the rim, taken from a point within said rim and looking outwardly.

Fig. 8 is an enlarged elevation, illustrative of my novel cover for the valve stem or inflation tube of a tire; the said cover being shown with its closure cap partly open.

Similar numerals of reference designate corresponding parts in all of the views of the drawings.

The hub 1 and the spokes 2 of the wheel may be of the ordinary well known constructions compatible with the purpose of my invention without affecting the latter.

At their outer ends the spokes 2 are suitably connected with the felly 3 of the wheel, and in combination with the said felly 3 I employ the removable rim section 4, best shown in Figs. 2, 5 and 6.

The felly 3 of the wheel is provided with lugs 5, designed to be engaged by grooves 6 in the inner side of the rim member 4. This provision is made in order to permit of the rim member 4 being readily slipped in lateral direction upon the felly 3 and also in order to prevent the rim member 4 from slipping or creeping in either direction around the felly 3. At 7 the body member 3 is provided with spring lugs as shown, which are designed to rest in slots in the felly 3, as well as in slots 9 in the rim member 4. Manifestly, this provision is calculated to effectually prevent casual, lateral slipping or displacement of the rim member 4. I would also have it understood at this point that the spring lugs 7 are susceptible of being quickly and easily pried outwardly, Fig. 3ª, whereupon the rim member 4 can be quickly and easily removed from the felly 3. I would also have it understood that the rim member 4 is split and is possessed of resiliency so as to be capable of springing inwardly with a view to enabling the tire to slip over the rim.

As will be readily understood from the drawings, the elements denominated spring lugs each comprises a spring strip 7ª, and a tongue 7ᵇ that extends outwardly from the spring strip. Each of the spring strips 7ª has its free end portion disposed in the loop of a lever 7ᶜ, which lever is fulcrumed between lugs 7ᵈ on the inner side of the felly 3, and has an inner arm portion which when swung inwardly will withdraw the outer end of the tongue 7ᵇ from the complementary socket 9 in the rim member 4, Fig. 3ª. When, however, the lever 7ᶜ is returned to the position shown in Fig. 3, the outer arm of the lever 7ᶜ will rest close against the spring strip 7ª, as shown in Fig. 3.

As clearly shown in the drawings, I provide a cover 10 for the reception of a valve stem or inflation tube 11, usually carried by the inner tube of the tire. The said cover 10 is fixed to the felly 3 of the rim, and is equipped with a hinged closure cap 12. Provision is made at 13 for a tight joint when the said cap 12 is closed, and from this it follows that the said cap 12 is adapted to effectually exclude dust and dirt from the stem or tube 11, and yet when it is desired to gain access to the said stem or tube, the cap 12 may be drawn into full opened position where it will be entirely out of the way. Manifestly, the cover 10, equipped with the cap 12, will serve to save much time incidental to the inflating of the tire.

Having described my invention, what I claim and desire to secure by Letters Patent, is:—

1. The combination in a rim construction, of a felly having radial apertures, a removable rim member on the felly and having sockets in registration with such apertures, spring strips connected to the inner side of the felly and having tongues extending through said apertures and into the said sockets, and loop-shaped levers fulcrumed at the inner side of the felly and normally receiving in their loops the free end portions of the spring strips.

2. The combination in a rim construction, of a felly having radial apertures, a removable rim member on the felly and having sockets in its inner side in registration with said apertures, spring strips connected to the inner side of the felly and having tongues extending outwardly through the apertures in the felly and removably arranged in the sockets of the removable rim member, and levers fulcrumed at the inner side of the felly and having inner arms disposed between the inner side of the felly and the free portions of the spring strips and also having arms that normally rest at opposite sides of the spring strips with reference to the felly.

In testimony whereof I affix my signature.

HARRY S. COX.